June 21, 1966   R. D. WIGHT   3,257,133
BALL JOINT
Filed Aug. 31, 1960   2 Sheets-Sheet 1
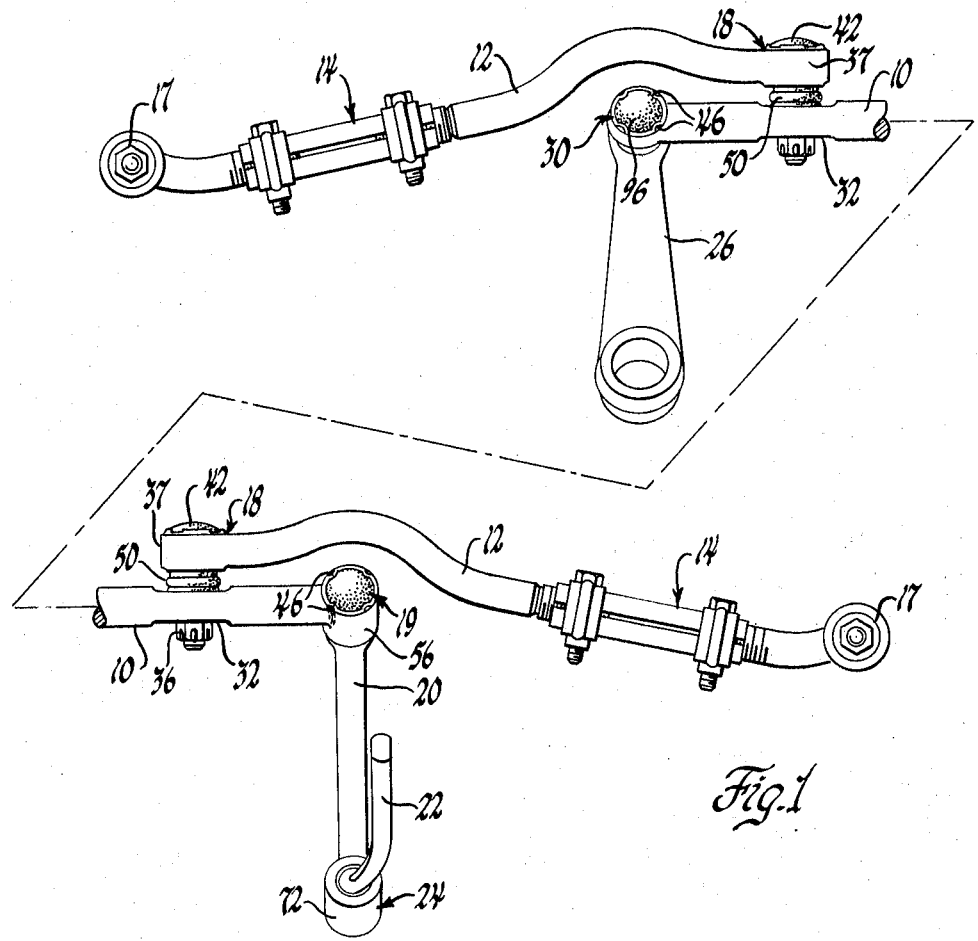
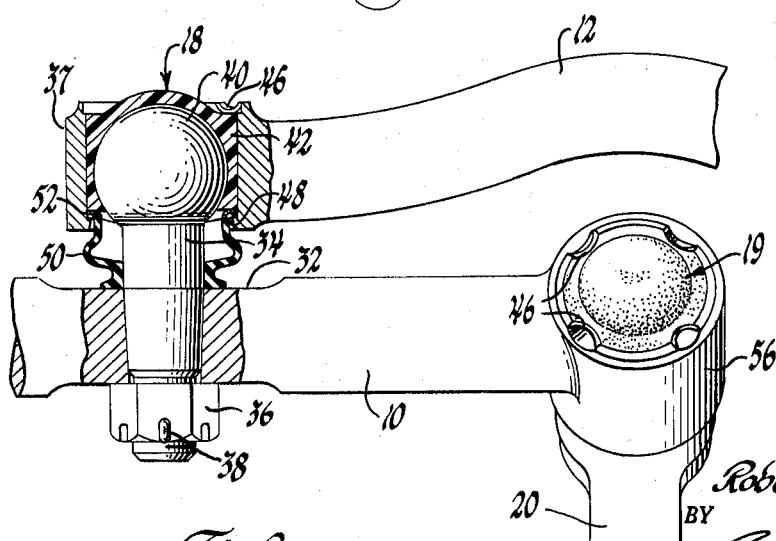
Fig.1
Fig.2
INVENTOR.
Robert D. Wight
BY
Bryce Beecher
ATTORNEY June 21, 1966 R. D. WIGHT 3,257,133
BALL JOINT Filed Aug. 31, 1960 2 Sheets-Sheet 2

INVENTOR,
Robert D. Wight
BY
Bryce Becker
ATTORNEY

3,257,133
BALL JOINT
Robert D. Wight, Saginaw, Mich., assignor to General Motors Corporation, Detroit, Mich., a corporation of Delaware
Filed Aug. 31, 1960, Ser. No. 53,258
7 Claims. (Cl. 287—87)

This invention relates to ball joints and more particularly pertains to ball joints of the so-called "greased-for-life" type.

Such joints find application, for example, in steering linkages where they are employed to interconnect the linkage components. As a class they are characterized by the incorporation therein of a plastic bushing or liner accommodating the head of the ball stud and making unnecessary periodic lubrication of the joint as is required with the more conventional joints involving metal-to-metal contact of the parts.

A joint conforming to the invention is distinguished by its structure and by the use therein of a lubricant capable of rendering the joint more resistant to torque quickly applied than to torque slowly applied. A joint possessing the latter characteristic is advantageous as applied in a steering linkage in that it serves to damp or snub abrupt turning movements derived from road forces while permitting smooth operation of the linkage during steering and during reversal of the steering parts to center after the steering force has been removed. This reversal of the steering parts, as well understood by those familiar with the art, occurs automatically due to the geometry of the linkage and front suspension.

Preferred embodiments of the invention are illustrated in the accompanying drawings which will be referred to in the further description. In the drawings:

FIGURE 1 is a broken plan view of a steering linkage incorporating the invention;

FIGURE 2 is an enlarged fragmentary plan, with parts appearing in section;

Referring first to FIGURE 1, there appears a typical parallelogram linkage including a relay rod 10 having connected thereto near either end thereof a tie rod 12 provided with a turnbuckle device 14 whereby the tie rod may be lengthened or shortened as necessary during installation of the linkage. Such turnbuckle devices being common in the art, the same need not be described in any detail here.

Figure 3:
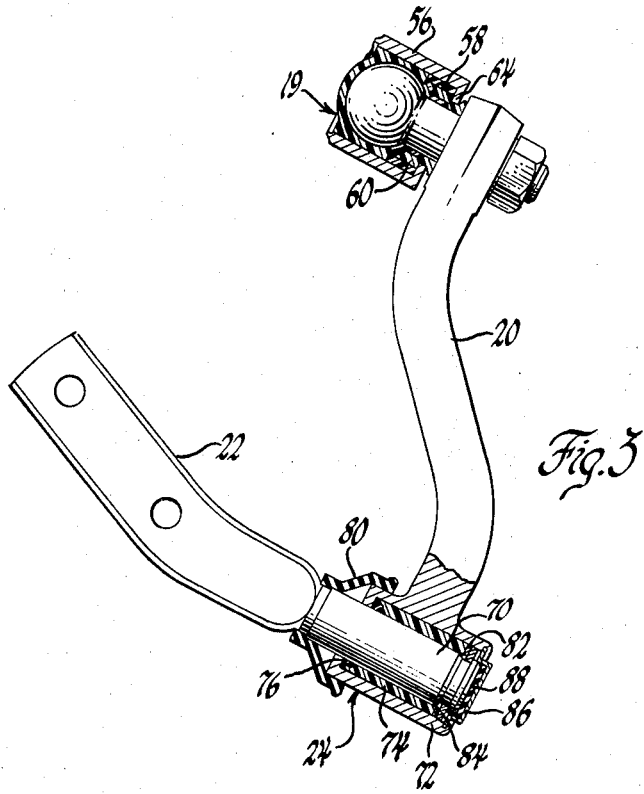
FIGURE 3 shows the idler arm assembly, with parts of the joints appearing in section.

Each tie rod at its outer end is adapted for connection to a steering knuckle arm, not shown, whereby the dirigible wheels of the vehicle are rotated about their kingpin axes. At their inner ends the tie rods are linked to the relay rod 10 through ball joints 18. Outward of the right hand ball joint 18 the relay rod makes connection with an idler arm 20 through a ball joint 19 which, like joints 18, conforms to the invention. The idler arm 20 is supported by a bracket 22 adapted to be fixedly connected to the frame of the vehicle. A joint 24 between the arm 20 and the bracket support 22 is preferably of a design as illustrated in FIGURE 3 herein, later to be explained.

At its end opposite the idler arm 20 the relay rod 10 is linked to a pitman arm 26, such connection made through a ball joint 30, also conforming to the invention. It will be understood that as installed in the vehicle, pitman arm 26 is actuated through the usual reduction gearing contained in a housing fixed to the vehicle frame.

The illustrated linkage is formed of forged links rather than the more conventionally used tubular links. In the interest of the connections 18 the relay rod 10 is flatted and bored at 32. Each bore (FIGURE 2) accommodates the shank of a ball stud 34 which is fastened to the rod by means of a nut 36 secured by a cotter pin 38.

The inner end of each tie rod 12 will be seen formed as an eye 37 which encircles the ball head 40 (FIGURE 2) of the corresponding stud 34. A plastic liner 42 is cupped over the ball head and is disposed under compression between the ball head and the wall of the eye. This liner which is desirably formed of Delrin, an acetal resin, is restrained against axial displacement by an annular rib 48 and by radial projections 46 (FIGURE 1) formed by a staking operation. A boot or dust shield 50 surrounding and gripping the shank of the ball stud has an annular reinforced rim portion 52 crimped between the liner 42 and the rib 48.

In the assembly of the joint 18 the liner 42, having a selected lubricant distributed about the inner surface thereof, is first snapped over the ball head 40 whereafter the stud with a linear so affixed is forced into the eye to its shown position against the rim 52 of the boot. The staking operation giving rise to the projections 46, is, of course, carried out subsequent to location of the ball head and the liner in the eye.

Joints 17 at the outer ends of the tie rods 12, which joints serve in the linking of such rods to the steering knuckle arms on installation of the linkage, are identical in construction to the joints 18.

Going now to FIGURE 3, it is desirable in view of the location of the joint 19 that the same be stabilized against excessive rocking movements, that is, movements about an axis normal to the rotative axis. To this end there is included within the eye 56 an annular element 58 which may be of the same composition as the plastic liner and which is formed to provide a pocket receiving a portion of an elastomeric cushioning ring 60 extending outwardly of the eye 56 to abut a face of the idler arm 20. Element 58 spaces the liner from the rib 64 which will be noted as having shouldering engagement with the ring 60. With the construction as described, it should be apparent that any relative rocking movement between the ball stud and the eye is limited by the extent to which the element 60 can be compressed. This limited rocking movement is desirable as providing a tolerance useful during installation of the linkage.

The joint 24 at the support end of the idler arm 20 is made cylindrical because at such point virtually no rocking can be tolerated. This joint will be observed as comprising a cylindrical journal portion 70 integral with the bracket 22. Disposed under compression between the journal 70 and the inner wall of the housing 72 is a bushing 74 which, like the liners aforementioned, is desirably formed of Delrin. An O-ring seal 76 accommodated in an annular recess formed in the bushing prevents the escape of lubricant. Boot 80 serves an obvious purpose.

At its end opposite the seal 76 the bushing 74 engages a thrust washer 82 spacing such end of the bushing from a lock ring 84 seating in an annular groove formed in the journal 70. A closure cap 86 is formed to seat a Delrin thrust bearing 88 for the end of the journal.

Figure 4:
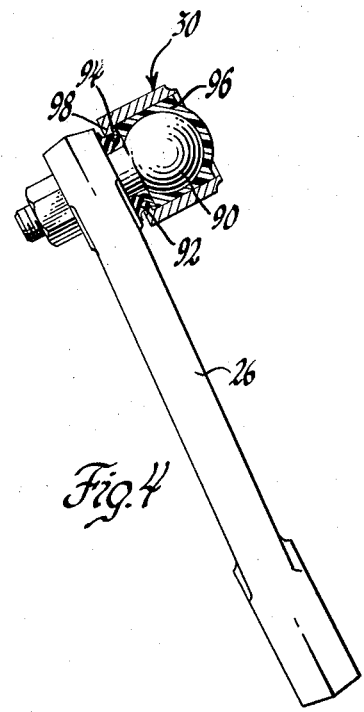
FIGURE 4 shows the pitman arm assembly, with the joint shown partly in section.

In the case of the joint 30 illustrated by FIGURE 4, the shank of the ball stud 90 is abbreviated, making possible the use of a seal 92 in lieu of the boot employed in connection with the joints 18. As suggested, the joint 30 does not need to allow for as great a degree of universal movement as the joints 18. The seal 92 includes a reinforcing metal stamping 94 secured between the Delrin liner 96 and the rib 98 which prevents axial displacement of the liner in the direction toward the rib. As shown in FIGURE 1, the joint 30 includes the radial projections 46 serving in the retention of the liner.

As evidenced by the lack of any grease fittings the joints herein are lubricated only once, that is at the factory. Thus the lubricant must be long-lived. It is also essential due to the high load condition resulting from the compressed state of the plastic liners that the lubricant have a natural adherence with respect to the metal of the ball stud and the material of which the liner is composed. It has been found that organic polar compounds, suitably bodied where necessary through the use of additives which may or may not of themselves have a lubricating action, possess the "wetting" capability required by the joints.

An organic polar compound suited for the practice of the invention must exhibit a Newtonian behavior, that is, its shear rate, as determined, for example, using a capillary viscometer, must be substantially proportional to the shear stress.

As a general statement, whenever a fluid (or more broadly, a continuously deformable material) flows, there is some internal resistance to such deformation. This resistance is a simple definition of viscosity. Newton was the first to recognize the mathematical principle underlying the phenomenon of fluid motion. He considered the movement of a liquid cylindrical shell infinite in length and rotating about its axis in an infinitely extended liquid. This consideration led to a simple mathematical statement for an ideal liquid:

$$F/A = \eta \, dv/dr$$

in which:

- $v$ = velocity of flow
- $r$ = radial distance from center
- $dv/dr$ = shear rate, velocity gradient (increment of velocity per increment of radial distance)
- $\eta$ = proportionality constant (viscosity coefficient)
- $F$ = force
- $A$ = area
- $F/A$ = shear stress To visualize this concept one may imagine two parallel planes of liquid of equal area. When one plane slips past the other under an applied force, the rate at which this slippage occurs is called the "shear rate." If one considers multiplane or mass flow, the relative shear rate is called the "velocity gradient." A liquid conforming to the above equation, in which the shear rate is proportional to the shear stress, is called a Newtonian liquid.

It is the Newtonian behavior of the organic polar compound or material which renders the joint herein capable of snubbing abrupt torque movements characterizing the condition which engineers in the steering field have long termed "wheel fight." This expression, as well understood, refers to the reaction of the steering train to road forces as ruts, bumps, etc.

Figure 5:
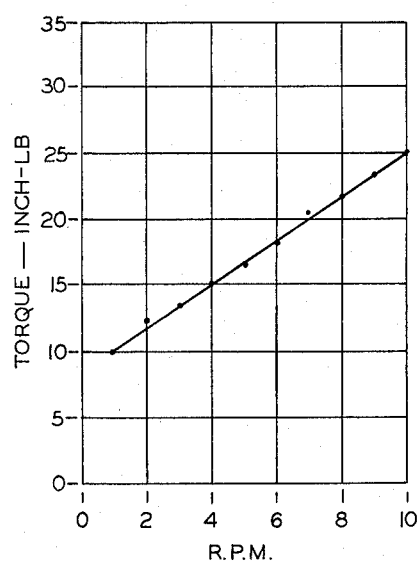
FIGURE 5 is a graph reflecting the viscosity characteristics of lubricants employed in the practice of the invention.

Using Delrin as the material of the plastic liner, it has been determined that excellent results are had if there is employed as the lubricant a fatty amine salt of a dialkyl acid pyrophosphate, the same being rendered workable by the inclusion in comminuted form of from 15–40%, preferably about 20%, by weight of Teflon. The graph of FIGURE 5 in which torque readings in inch-pounds are plotted as ordinates and revolutions-per-minute as abscissae illustrates the characteristics of such lubricant in respect of its action under slow torque and in respect of its ability to mitigate wheel fight. Thus, it will be seen that whereas only 10 inch-pounds of effort are required to overcome the resistance of the joint when the turning rate is 1 r.p.m., 25 inch-pounds are required when the turning rate is 10 r.p.m. Without the lubricant the resistance of the joint to turning is virtually unaffected by the turning rate.

The invention, of course, is not limited to liners formed of Delrin. Thus, polymeric amides and polyethylene type high polymers may be used as the liner material, although not necessarily with like results. It will be appreciated that the nature of the liner material necessarily affects the choice of the organic polar compound and that the optimum lubricant in any given case can only be determined by experimentation.

I claim:

1. A joint construction comprising an eye member, a connector member having a head portion within said eye member, a plastic liner secured under compression between the wall of the eye and said head portion, the inner wall of said liner being contoured in correspondence with the shape of said head portion, and a thin film of lubricant between said liner and said head portion, said lubricant having a shear rate substantially proportional to its shear stress whereby the joint construction offers greater resistance to fast turning movements than to slow turning movements.

2. A joint construction comprising an eye member having a generally cylindrical inner wall, a ball stud disposed with its ball head within said eye member, a plastic liner secured under compression between said wall and said ball head, the inner surface of said liner being contoured as said ball head, and a thin film of lubricant between said liner and said ball head, said lubricant being a polar organic preparation possessing chemical affinity for the materials of which said ball head and said liner are formed and having a shear rate substantially proportional to its shear stress whereby the joint construction offers greater resistance to fast turning movements than to slow turning movements.

3. A joint construction as defined by claim 2 wherein said eye member comprises an inwardly projecting rib at one end thereof serving to prevent axial displacement of said liner in the direction toward said rib and wherein said eye member at its other end carries a plurality of radial projections securing said liner against axial displacement in the direction away from said rib.

4. A joint construction as defined in claim 2 wherein said eye member includes an inwardly projecting rib at one end thereof, surface of said liner being contoured as said ball head, and means limiting relative rocking movements between said eye member and said ball stud, said means including a stabilizer surrounding the shank of the ball stud and abutting said rib and said liner, said stabilizer having an annular pocket therein accommodating a rubber element having shouldering engagement with said rib.

5. A joint construction comprising an eye member having inwardly extending projections at one end of the eye and an inwardly projecting rib at the other end thereof, a ball stud disposed with its ball head within said eye, a plastic liner cupped about said ball head and secured under compression between the wall of the eye and said ball head, said liner being held against axial displacement by said projections and said rib, and a thin film of lubricant between said liner and said ball head, said lubricant being a polar organic Newtonian liquid preparation possessing chemical affinity for the materials of which said ball head and said liner are formed whereby the joint construction offers greater resistance to fast turning movements than to slow turning movements.

6. A joint construction as defined by claim 5 in which said liner is formed of acetal resin and in which the lubricant comprises a fatty amine salt of a dialkyl acid pyrophosphate, the same being rendered workable by the inclusion in comminuted form of 15–40% by weight of Teflon.

7. A joint construction as defined by claim 6 additionally comprising a seal encircling the shank of said ball stud and including an annular rim portion secured between the said rib and the adjacent surfaces of said liner.

References Cited by the Examiner

UNITED STATES PATENTS 2,868,572  1/1959  Herbenar.

FOREIGN PATENTS 1,116,190  1/1956  France.
725,724    3/1955  Great Britain.

OTHER REFERENCES

The publication "Delrin acetal resin," published June, 1957 by Polychemicals Department of E. I. du Pont de Nemours and Co., (Inc.), Wilmington 98, Delaware. Pages 13 and 14 are pertinent.

"UCON" Fluids and Lubricants published by the Special Products Division Carbide and Carbon Chemicals Corporation Unit of Union Carbide and Carbon Corp., 30 East 42 St., New York 17, N.Y., copyright 1947.

CARL W. TOMLIN, *Primary Examiner.*

MORRIS M. FRITZ, WALTER A. SCHEEL, THOMAS F. CALLAGHAN, *Examiners.*

A. V. KUNDRAT, *Assistant Examiner.*

UNITED STATES PATENT OFFICE
CERTIFICATE OF CORRECTION

Patent No. 3,257,133                                   June 21, 1966

Robert D. Wight

It is hereby certified that error appears in the above numbered patent requiring correction and that the said Letters Patent should read as corrected below.

Column 2, line 4, after "connection" insert -- being --; line 30, for "with a linear" read -- with the liner --; column 4, lines 51 and 52, strike out "surface of said liner being contoured as said ball head".

Signed and sealed this 1st day of August 1967.

(SEAL)
Attest:

Edward M. Fletcher, Jr.                                EDWARD J. BRENNER
Attesting Officer                                          Commissioner of Patents